(12) United States Patent
 Ibsies (10) Patent No.: US 10,257,470 B2
(45) Date of Patent: Apr. 9, 2019

(54) AUTOMATED DOOR

(71) Applicant: Fadi Ibsies, Tigard, OR (US)

(72) Inventor: Fadi Ibsies, Tigard, OR (US)

( * ) Notice: Subject to any disclaimer, the term of this patent is extended or adjusted under 35 U.S.C. 154(b) by 433 days.

(21) Appl. No.: 13/846,002

(22) Filed: Mar. 18, 2013

(65) Prior Publication Data
US 2014/0267739 A1    Sep. 18, 2014

(51) Int. Cl.
*E05B 41/00*    (2006.01)
*H04N 7/18*    (2006.01)
*G07C 9/00*    (2006.01)

(52) U.S. Cl.
CPC ......... *H04N 7/183* (2013.01); *G07C 9/00896* (2013.01); *H04N 7/188* (2013.01)

(58) Field of Classification Search
CPC ............................ G07C 9/00174; H04N 7/183
USPC .......................................................... 348/156
See application file for complete search history.

(56) References Cited

U.S. PATENT DOCUMENTS

| | | | |
|---|---|---|---|
| 4,763,937 A | 8/1988 | Sittnick, Jr. et al. | |
| 5,855,027 A | 1/1999 | Macedo | |
| 5,878,530 A | 3/1999 | Eccleston et al. | |
| 5,963,000 A | 10/1999 | Tsutsumi et al. | |
| 6,108,975 A | 8/2000 | Bailey | |
| 6,486,793 B1 | 11/2002 | Buccola | |
| 6,967,587 B2 | 11/2005 | Snell et al. | |
| 7,042,492 B2 * | 5/2006 | Spinelli | 348/143 |
| 7,068,179 B2 | 6/2006 | Snell et al. | |
| 7,234,201 B2 | 6/2007 | Brown et al. | |
| 7,805,810 B2 | 10/2010 | Hoffman | |
| 7,971,316 B2 | 7/2011 | Copeland, II et al. | |
| 8,141,296 B2 | 3/2012 | Bem | |
| 8,284,018 B2 | 10/2012 | Ibsies | |
| 8,390,219 B2 | 3/2013 | Houser | |
| 8,407,937 B2 | 4/2013 | Houser | |
| 9,771,751 B2 | 9/2017 | Ibsies | |
| 2002/0176607 A1 | 11/2002 | Bond et al. | |
| 2005/0073425 A1 | 4/2005 | Snell et al. | |
| 2007/0056084 A1 | 3/2007 | Watt et al. | |
| 2008/0222963 A1 * | 9/2008 | Zwart | E05B 47/00 49/503 |
| 2008/0230554 A1 | 9/2008 | Randolph | |
| 2009/0000196 A1 * | 1/2009 | Kollar | E05F 15/43 49/28 |
| 2009/0079813 A1 * | 3/2009 | Hildreth | H04N 7/147 348/14.03 |
| 2011/0249107 A1 * | 10/2011 | Chiu | 348/77 |
| 2013/0169815 A1 * | 7/2013 | Carney et al. | 348/156 |
| 2014/0313154 A1 * | 10/2014 | Bengtsson | H04B 13/005 345/174 |
| 2014/0345396 A1 * | 11/2014 | Riedel | B64D 25/14 73/865.4 |
| 2015/0287254 A1 | 10/2015 | Ribas et al. | |

\* cited by examiner

*Primary Examiner* — Jonathan R Messmore
(74) *Attorney, Agent, or Firm* — Law Office of Karen Dana Oster, LLC (57) ABSTRACT

An automated door-opening device includes a first camera disposed on the outside of the door. The first camera is adapted to recognize a predetermined pattern of a gesture made by a patron. The gesture made in front of the first camera opens the door by a first actuator. A second actuator can be used to lock or unlock the door, thereby providing full hand-free operation of the door.

22 Claims, 7 Drawing Sheets

AUTOMATED DOOR

FIELD OF THE INVENTION

This invention relates to an apparatus and method of use for automatically opening, closing, locking, and unlocking a door and more specifically for hands-free operation of a door.

BACKGROUND

Recently, many devices and systems have been introduced to automate and render "hands-free" various operating fixtures of public bathrooms. From simple foot operated garbage can lids to removal of entry doors, varied attempts to render public bathrooms hygienic and eliminate hand-contact with fixtures has been limited to on-off, start-stop, or open-close operations of traditional facilities.

One attempt to provide a hands-free door-opening apparatus, described by Snell et al. in U.S. Pat. No. 7,068,179 on 27 Jun. 2006, includes an apparatus for automatically opening a swinging restroom door. It comprises an actuator, a control unit, and a power assisted drive mechanism and proximity sensor. This apparatus is applied to an exit/entry door to a bathroom and is not adapted for use on a stall-door. A patron waves his or her hand within the detection zone of the proximity sensor, and this movement activates the door to open. Snell, however, does not contemplate adapting the apparatus for a stall-door, which typically is a much lighter door and lacks the physical space requirements for his apparatus. Further, not contemplated by Snell is the need for locking the enclosed area door when occupied by a patron and indicating to waiting patrons that the enclosed area is occupied.

Other attempts at hands-free operation of other bathroom fixtures include providing a sensor coupled to an activation mechanism whereby motion of a patron's hand within the proximity sensor's range causes towels to dispense from automated paper-towel dispensers, turns on a stream of water from a faucet, dollops a pre-determined amount of soap from a soap dispenser, or begins a time cycle activation of a heated hand dryer, for example. Motion sensors are also used to automate toilette flushing.

Yet, to date, no attempts have been made to successfully operate and lock "hands-free" an enclosed area door. The traditional method of locking enclosed area doors still requires the patron to contact a lever and bolt the door, or turn a cam to lock the stall-door. Further, there have been no successful attempts to enable hands-free opening and closing of the stall-door. The enclosed area door presents problems and challenges not contemplated by any prior-art attempts to automate bathroom facilities functions.

BRIEF SUMMARY OF THE INVENTION

Because the enclosed area door presents problems and challenges not contemplated by any prior-art attempts to automate bathroom facilities functions, there remains a need for a device that can be fit to existing stall-doors or incorporated into new stall-doors that enables a patron to open and close the door hands-free and further to lock the door without contacting any surfaces. Further, such an improvement should also inform waiting patrons that the enclosed area is occupied. Such an improvement should further include low power-consumption mechanisms and be easy to operate. Yet still another need is an easy-to-use device that enables disabled patrons to operate the enclosed area door without using their hands for both opening/closing and locking/unlocking.

DESCRIPTION OF THE INVENTION

Possible preferred embodiments will now be described with reference to the drawings and those skilled in the art will understand that alternative configurations and combinations of components may be substituted without subtracting from the invention. Also, in some figures certain components are omitted to more clearly illustrate the invention.

The present invention enables hands-free operation of a door 10 from inside or outside and includes manual override from both sides. To prevent unintended opening of the stall-door, the present invention includes at least one sensor 14 to determine if the restroom enclosed area is occupied. This sensor 14, in other contemplated embodiments, is a camera coupled to an image processor that is programmed to "see" whether space, such as a bathroom stall, or other enclosed area, is occupied. The determination of whether an enclosed area is occupied is a first condition, which will be further discussed below.

In addition, the present invention contemplates a stand-alone locking mechanism for retrofitting to existing power-actuated doors 10. It will be appreciated and understood by those skilled in this art that the invention described herein can be adapted for use on any such door where "hands-free" opening of the door and locking/unlocking of the door is desired. To avoid unwanted locking, unlocking, or opening of a door, a particular gesture is pre-programmed and predetermined. Any gesture is possible, however, care must be taken to avoid gestures that might appear to the camera similar to linear movement from, for example, someone simply walking past the camera. Thus, a wave or circular hand motion may be desired to be incorporated in the predetermined gesture.

Accordingly, the improved apparatus 20 for automatically opening, closing, locking, and unlocking a swinging door 10 includes a first actuator and power-assisted drive mechanism for opening and closing the door and a second actuator and associated power-assisted drive mechanism for locking and unlocking the door, a control unit, a power source (either on-board or remote) and a plurality of sensor units (e.g. sensors 14, 51, 53, 55, 63, 65, and 67). It is further contemplated that the mechanism for opening the door and the mechanism for locking the door could be combined into one mechanism. In one embodiment these are separate mechanisms, and both power drive mechanisms include a corresponding limit unit in communication with the mechanical components for opening and locking the enclosed area door so that manual operation can be affected without damage to the automatic components.

Figure 6:
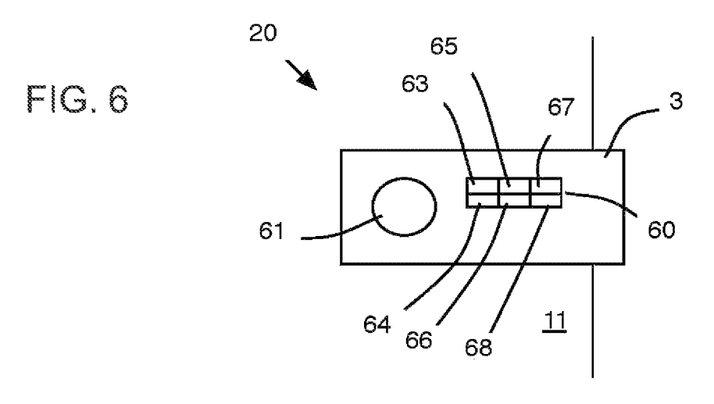
FIG. 6 is a back view of the embodiment of FIG. 4.

To operate the improved apparatus for automatically opening, closing, locking, and unlocking a swinging door 10 in a hands-free mode, first, an interior sensor 14 must sense that the enclosed area is unoccupied (a second condition). The apparatus indicates an unoccupied status by illuminating an LED indicator 60 (which may include individual LED indicators labeled as 64, 66, and 68 in FIG. 6) on the exterior 11 of the door 10. Then, the patron places a hand in front of the first camera 130 on the exterior side of the door and then moves the hand in a predetermined pattern or gesture. The first camera 130 (FIG. 11) reads this pattern, which is in communication with a processor that then interprets the series of images streamed from the first camera 130. If the gesture made by the user matches the predetermined pattern, an indicator light will glow solid green. The processor then commands the door-opening/closing drive mechanism to open the door.

Once the patron is inside the enclosure accessed by the door 10, a second camera 131 (FIG. 13) captures the gesture made by the user. Again, a predetermined pattern read by the second camera 131 by means of the processor, signals actuators that close the door. With the door closed and the enclosure occupied, an indicator 60 on the exterior 11 of the door 10 indicates that the enclosure is occupied, for example by displaying a solid red color. A corresponding indicator 5 on the inside 1 of the enclosure also illuminates to show the user what the status indicator outside shows.

To unlock and exit the enclosure, the patron waves the hand in a predetermined gesture pattern, which is read by the camera 131 (FIG. 13) and processed by the processor and the door 10 unlocks and opens.

To assist operation with seeing-impaired patrons, an audible signal may be used to augment the illuminated LED indicators 5, 60 and to indicate registration of the swiping hand movement in front of the respective sequence of proximity sensors (e.g. sensors 51, 53, 55, 63, 65, and 67). The controller can be programmable to vary options of opening, closing, locking, and unlocking. For example, the controller can be programmed to ignore commands to lock the enclosed area door 10, or can be programmed to automatically lock the door upon receiving a "close door" sequence from the interior proximity sensors. Similarly, to unlock the door, the controller can be programmed to require a first and second swipe past the proximity sensors. The direction and duration of the swipe may be programmed as required to enable full customization of the apparatus.

In one preferred embodiment, a low-power apparatus is contemplated wherein on-board storage cells (batteries) draw current from ambient light from a solar panel on the door or connected to the apparatus. The batteries provide sufficient power to run the two actuators for opening/closing and locking/unlocking. In this manner, the apparatus is a self-contained unit that can be retrofitted to existing enclosed area doors that use simple hinges (lacking any opening mechanism) and gravity to operate.

For example, a conventional rest-room enclosed area door 10 is relatively light-weight and is attached to the adjoining stall-wall by a top and bottom hinge element. The weight of the door does not require a supplemental mechanism to assist with opening or closing. The existing enclosed area door is simply pulled or pushed open or closed. The present invention readily adapts to the conventional enclosed area door and comprises an outer housing with a rigid shell and a variable shell adapted to fit varying widths of enclosed area doors. There is an exterior side and an interior side of the housing 3 corresponding to the orientation of the apparatus on an enclosed area door 10. This housing consists of a lightweight metal (such as aluminum or stainless steel) or a tough plastic material (such as ABS) or other similar material common to commercial rest-room construction as would be well-understood in this art. The housing protects the various components from vandalism and unintentional damage from use in high-volume public restrooms.

Figure 1:
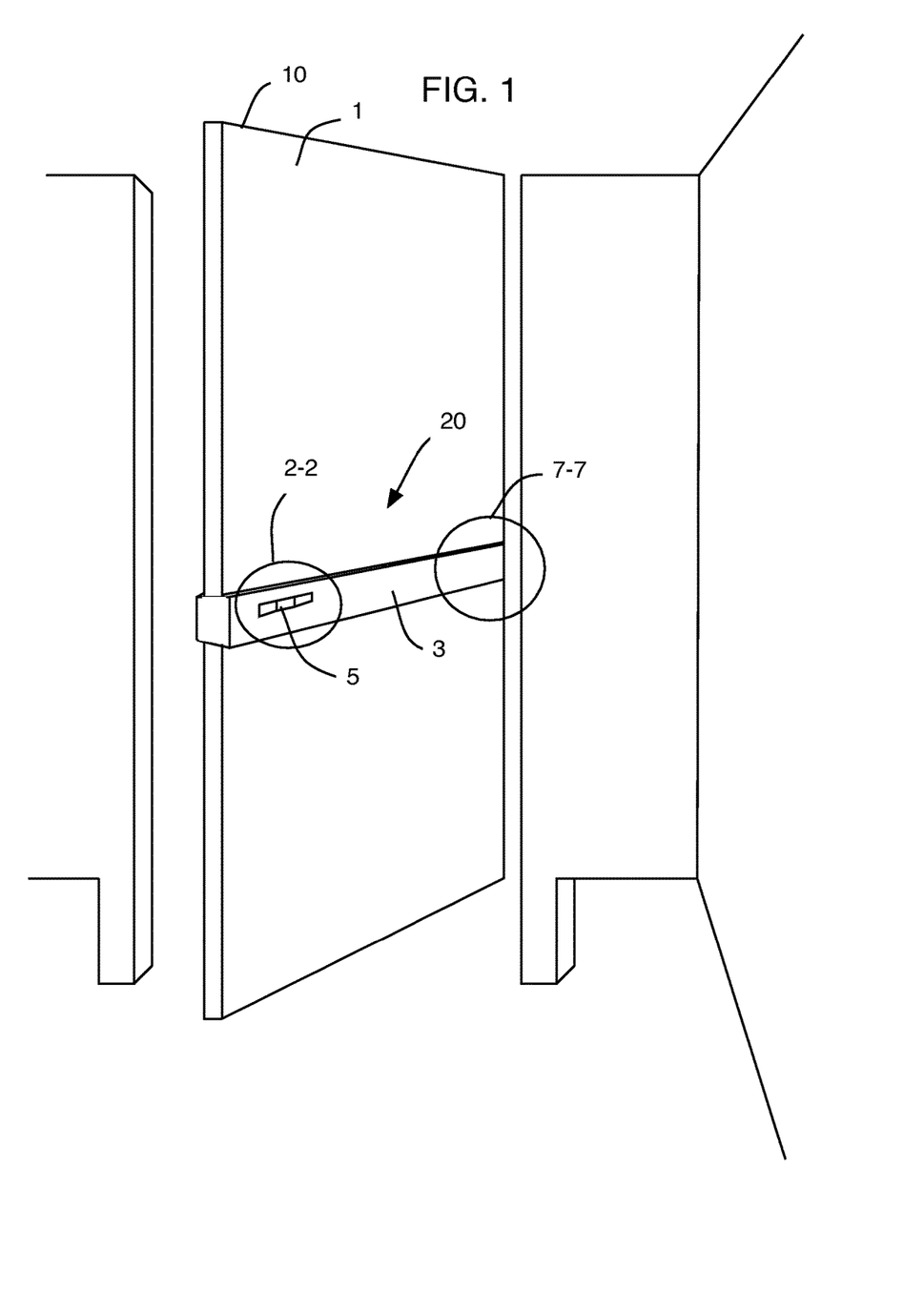
FIG. 1 illustrates a back view of a first preferred embodiment of the present invention in an environment of use.
Figure 8:
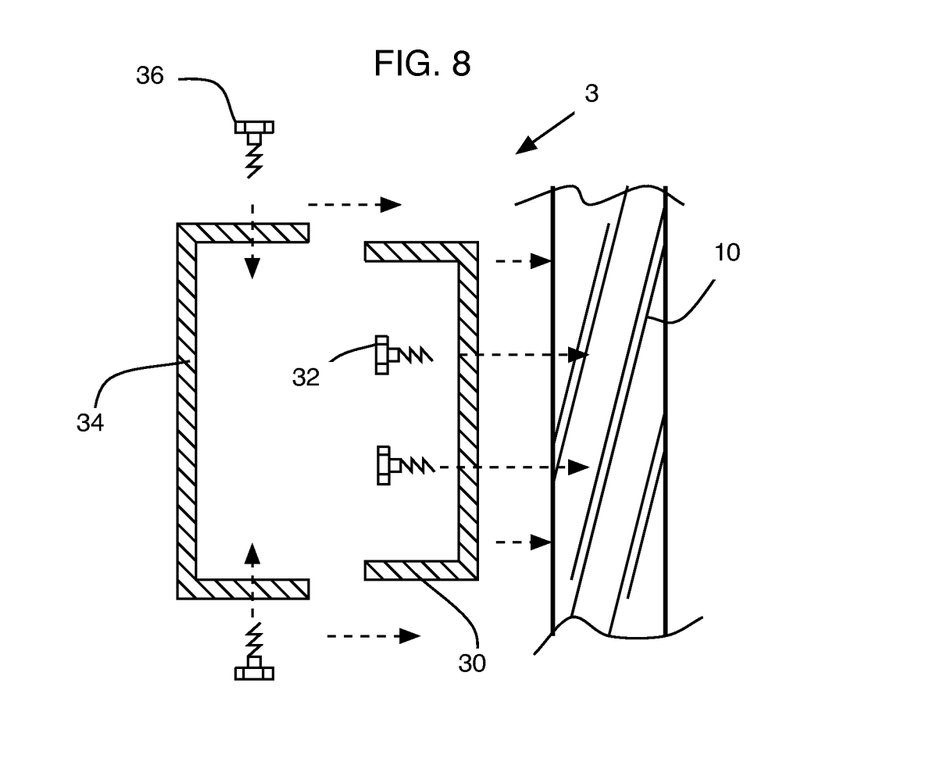
FIG. 8 is a side view of a possible mounting mechanism of the present invention.
Figure 9:
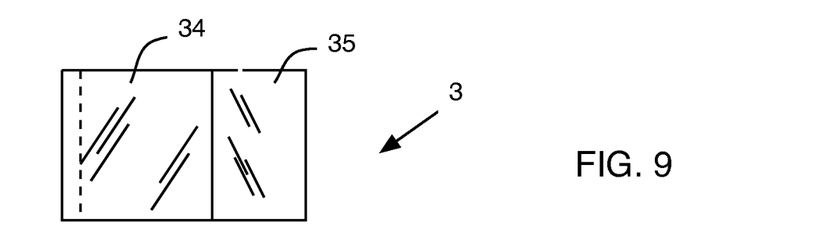
FIG. 9 is a front view of a possible housing or shell of the present invention showing a first amount of overlap of two portions of the shell.
Figure 10:
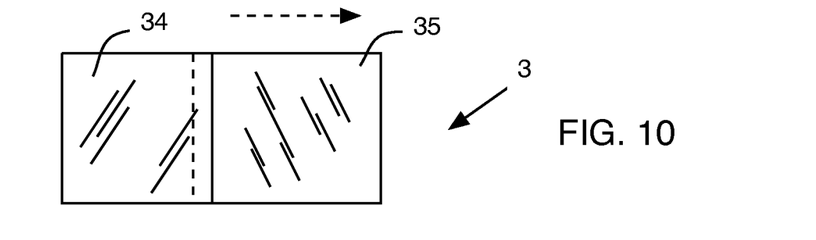
FIG. 10 is a second position of the embodiment of FIG. 9.

FIG. 1 illustrates an interior perspective of a portion of a conventional public restroom enclosed area including a door 10 having an interior surface 1. A preferred embodiment of the present invention includes a hands-free operation module 20 for the enclosed area door, of which a portion is mounted on the interior face 1 of the door 10. This interior portion of the module 20 includes a housing 3, at least a portion of which is a rigid shell segment or a plurality of overlapping segments (for example segments 34 and 35 of FIGS. 9 and 10) to accommodate varying widths of enclosed area doors. The shell 3 includes a mounting plate 30 (See FIG. 8), which affixes to the enclosed area door in a conventional manner, such as sheet-metal screws 32 fastening the plate to the door. The plate, moreover, may include a flange or flanges extending from the mounting surface outward to provide a mating surface for mounting a portion of the exterior 34 of the shell to the enclosed area door via the flange and fasteners 36.

Relative to the interior face of the stall-door, the present invention 20 includes a shell disposed on a portion of the enclosed area door and extending at least partially, or preferably across the entire width of the enclosed area door. The shell 3 at a proximal end defined by the opening edge of the enclosed area door includes a sensor and display array (indicated generally by the encircled detail labeled 2 in FIG. 1), while the opposite, distal end of the shell includes a mechanism for opening and closing the door (indicated generally by the encircled detail labeled 7 in FIG. 1).

Figure 3:
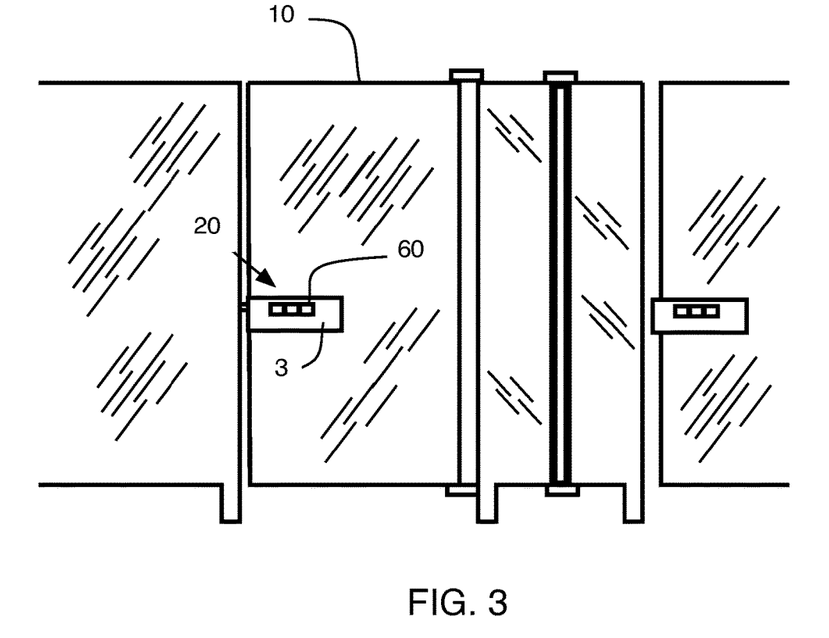
FIG. 3 is a front view of the first preferred embodiment of the present invention in an environment of use.
Figure 4:
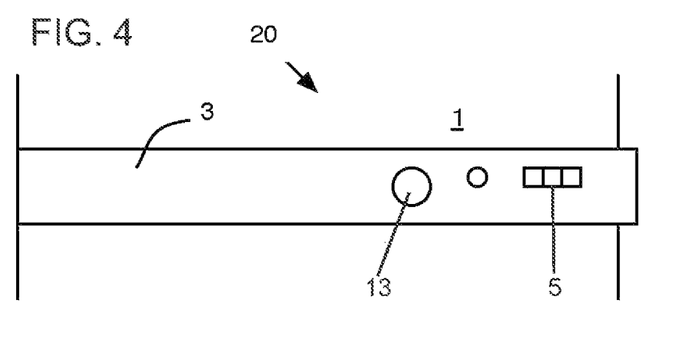
FIG. 4 is a front view of a second embodiment of the present invention.

FIG. 3 illustrates the exterior face 11 of the enclosed area door 10. On this side, the present invention 20 includes a shell 3 covering only a portion of the exterior of the enclosed area door, the portion being sufficient to present a sensor 14 and display 60 to patrons. FIG. 4, a top view of the present invention 20, illustrates an enclosed area door 11 with the shell 3 surrounding the door, a portion of which extends to the exterior face, and a portion of which extends along the interior face of the door and a connecting segment, or flat plate that is wide enough to carry electrical communication signal wires from the interior portion of the shell to the exterior face, and yet slim enough to enable normal operation (opening/closing and locking/unlocking) of the enclosed area door.

Figure 2:
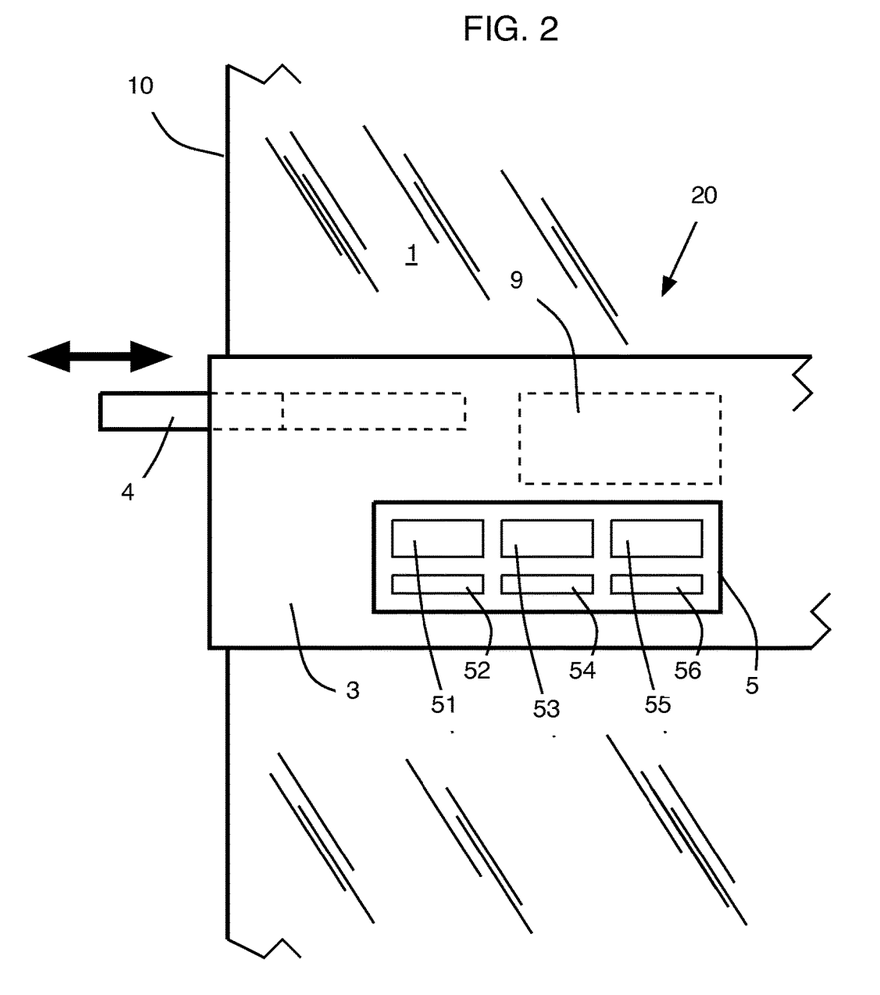
FIG. 2 is a detail view of section 2-2 of FIG. 1.

FIG. 2 shows a portion of the interior face 1 of the enclosed area door 10 and details a portion of the present invention 20 including the shell housing 3 having a display and sensor array 5. The housing further covers and holds therein a lock mechanism 4 and controller (or preferably a processor 9) with power supply (commonly referenced by the single reference numeral 9 in FIG. 2). This processor and power supply, naturally, can be two separate units, such as a solid-state logic board and separate battery pack coupled by electrical wires for transferring power to the board and further in electrical communication with the various components as would be understood by those skilled in this art.

Figure 11:
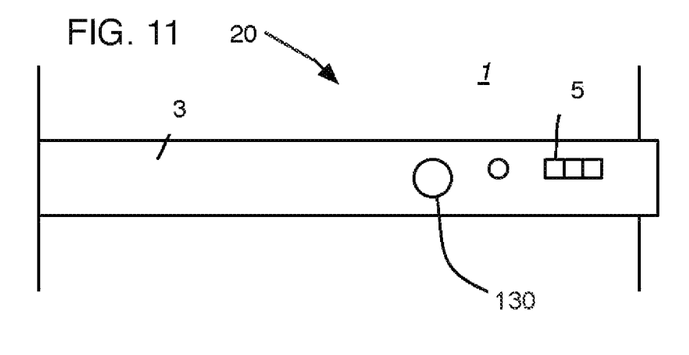
FIG. 11 is a front view of the housing of FIG. 9 and further shows the first camera.
Figure 12:
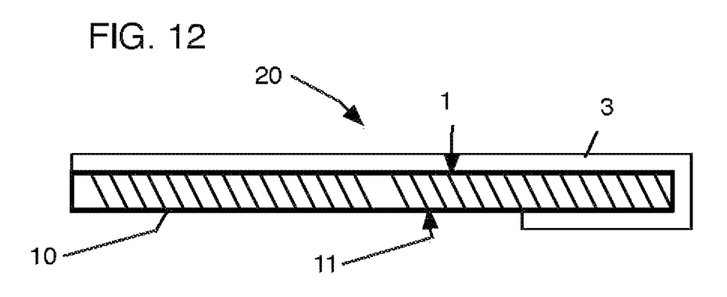
FIG. 12 is a top sectional view of FIG. 11.
Figure 13:
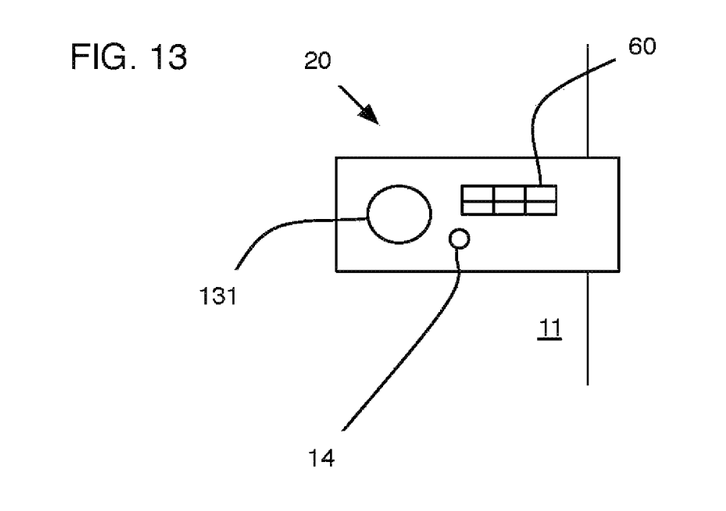
FIG. 13 is a back view of FIG. 12 and shows the second camera.

Making general reference to FIGS. 11-13, the first camera 130 faces outward and includes a display, such as an LED display array 5 that consists of at least one light having a first and preferably a second color. Alternatively, a series of LED indicator lights (e.g. LED indicator lights 52, 54, and 56 as shown in FIG. 2) can be used to show different status conditions, such as occupied or available, and that the gesture is being interpreted or misinterpreted by the processor (i.e. a flashing green indicates that the gesture is correct, but a flashing red light indicates that the gesture is not being understood).

Figure 5:
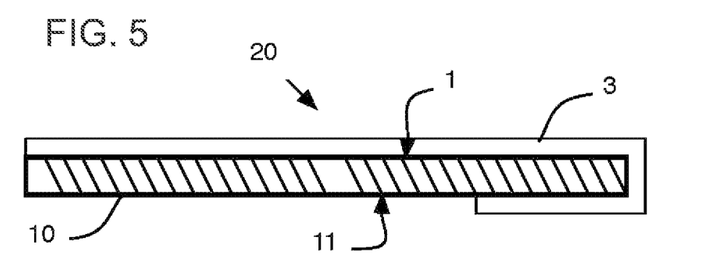
FIG. 5 is a top view of the embodiment of FIG. 4.

Both the interior portion and exterior portion of the invention 20 include a manual override handle 13, 61. On the inside of the stall, the shell 3 includes a handle 13 (FIG. 5) that mechanically connects to the lock pin and slides back and forth horizontally as the lock pin actuates from unlocked to locked and back. The handle is sufficiently large to allow a patron to grab hold and slide the lock in the direction desired and pull or push the door to the desired open or closed position. On the exterior face, a handle 61 (FIG. 6) includes a key lock to isolate the handle from movement to prevent unwanted operation of the lock mechanism. However, in emergency or other situations, the restroom management can insert a key to enable exterior manual opening/closing and/or locking/unlocking of the enclosed area door.

Also included on the interior portion of the shell 3, an occupied sensor 14 determines whether the enclosed area is occupied by a patron. If so, a signal is sent to the controller causing the exterior LED to illuminate an occupied sequence (i.e. three red lights, or illuminating a back-lit text stating "occupied," or other known means of communicating that the enclosed area is in use by a patron). Conversely, the same sensor 14, detecting that the enclosed area is unoccupied, signals the controller to display a "vacant" signal to the exterior display 60.

As shown in FIG. 13, there is also an inward facing camera 131, its operation and configuration is very similar to the outward facing camera 131 and the inside portion of the door may also include one or more indicator lights (shown as LED indicator 60), as previously explained.

Not shown in the drawing, however, as would be well-understood by those in this art, the conventional lock mechanism for enclosed area doors typically comprises a simple bolt pin that slides or extends horizontally from an open position to a closed position. In the closed position, a cooperating mechanical fixture mounted to the stationary wall-portion of the enclosed area receives a portion of the bolt pin, which prevents the door from swinging open. This is a very simple and affective design. The present invention includes an electro-magnet that, when charged, magnetically couples to the traditional lock pin, or a pin that is substantially similar in operation. So energized, the controller can then signal an actuator to move from a first position to a second position and thereby draw, by the magnetic coupling, the pin open. Simple mechanical transfer of motion is used to push the pin into the locked position.

Figure 7:
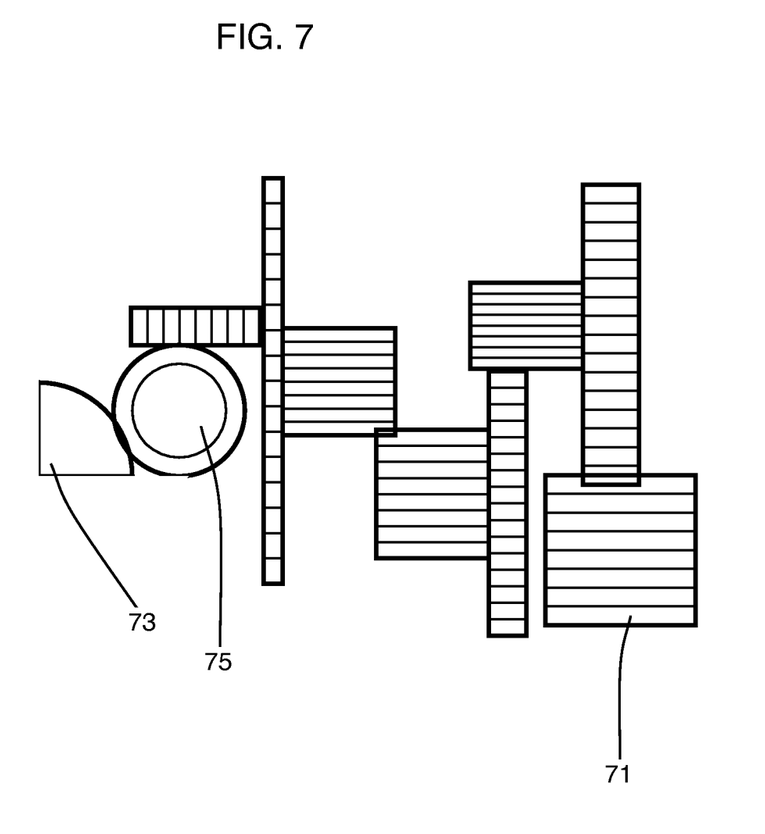
FIG. 7 is a partial view of section 7-7 of FIG. 1.

Because enclosed area doors are relatively light-weight (compared to conventional doors), a simple opening mechanism and low-power motor is all that is needed to open the door. A simple DC motor coupled to a gear set (see FIG. 7) enables forward or reverse rotation of the motor spindle gear 71. This rotary motion is distributed through a gear-set to the door opening gear 75, which meshes with a similar gear on the door 73. To reduce the relative high-speed rotation of the motor at gear 71, a series of reduction gears transfers the vertical-axis rotation to horizontal axis rotation and simultaneously reduces the speed to open and close the enclosed area door coupled to gear 73 (not shown in the drawings). A clutch (not shown) enables a manual override of the door opening an closing with out engaging and damaging the motor.

Although the invention has been particularly shown and described with reference to certain embodiments, it will be understood by those skilled in the art that various changes in form and detail may be made without departing from the spirit and scope of the invention.

I claim:

1. An improved apparatus for opening and closing a door, the improved apparatus comprising:
    (a) a first camera or sensor on a first side of the door;
    (b) a second camera or sensor on a second side of the door;
    (c) a processor:
        (i) the processor being in communication with the first camera or sensor, the processor adapted to receive a first data signal from the first camera or sensor;
        (ii) the processor being in communication with the second camera or sensor, the processor further adapted to receive a second data signal from the second camera or sensor; and
        (iii) the processor further comprises a gesture-recognition or movement pattern-recognition module adapted to read the first and second data signals to determine whether the first data signal or the second data signal is at least one predetermined gesture or movement pattern;
    (d) a first actuator in communication with the processor, the first actuator adapted to open the door when activated by the processor when the gesture-recognition or movement pattern-recognition module determines the gesture or movement pattern captured by the first or second camera or sensor is at least one predetermined gesture or movement pattern; and
    (e) at least one first display on the first side of the door, the at least one first display for indicating a condition or status, the condition or status selected from the group consisting of:
        (i) an area associated with the door is occupied; and
        (ii) an area associated with the door is available.

2. The apparatus of claim 1 further comprising a second actuator in communication with the processor, the second actuator having a closed position and an open position, the second actuator coupled to a locking mechanism, the locking mechanism being locked when the second actuator is in the closed position and the locking mechanism being unlocked when the second actuator is in the open position, the second actuator adapted to lock the door when activated by the processor when the gesture-recognition or movement pattern-recognition module determines the gesture or movement pattern captured by the first or second camera or sensor is at least one predetermined gesture or movement pattern, the second actuator adapted to unlock the door when activated by the processor when the gesture-recognition or movement pattern-recognition determines the gesture or movement pattern captured by the second camera or sensor is at least one predetermined gesture or movement pattern.

3. The apparatus of claim 1, further comprising:
    (a) at least one light-emitting diode display device having at least two colors on the first side of the door; and (b) at least one light-emitting-diode display device having at least two colors on a second side of the door;

(c) wherein the corresponding associated light-emitting-diode display devices display at least one color corresponding to the sequence of signals received by the controller.

4. The apparatus of claim 1 further comprising a housing comprising a first shell segment on the first side of the door, the first shell segment encapsulating at least a portion of the processor, at least a portion of a locking mechanism, and at least a portion of the first camera or sensor.

5. The apparatus of claim 1 further comprising a housing comprising a first shell segment on the first side of the door, the first shell segment encapsulating at least a portion of the processor, at least a portion of a locking mechanism, and at least a portion of the first camera or sensor, wherein the housing further comprises a second shell segment, a portion of which nests inside the first shell segment to provide a horizontally extendable housing.

6. The apparatus of claim 1 further comprising a housing comprising a first shell segment on the first side of the door, the first shell segment encapsulating at least a portion of the processor, at least a portion of a locking mechanism, and at least a portion of the first camera or sensor, and further comprising a door-engaging gear set at least partially encapsulated by the housing and the gear set coupled to a DC motor, the DC motor in electrical communication with the processor.

7. The apparatus of claim 1, wherein the at least one predetermined gesture or movement pattern is a hand motion comprising a wave or a circular hand motion.

8. The apparatus of claim 1 further comprising:
(a) at least one light-emitting diode display device having at least two colors on the first side of the door; and
(b) at least one light-emitting-diode display device having at least two colors on a second side of the door.

9. The apparatus of claim 1 further comprising at least one display device on a second side of the door.

10. A method for hands-free operation of a door, the method comprising:
(a) providing a first camera or sensor on a first side of the door;
(b) providing a second camera or sensor on a second side of the door;
(c) providing a processor adapted to couple to the door, the processor in bi-directional communication with each camera or sensor;
(d) providing a mechanism adapted to open the door in response to a first predetermined gesture or movement pattern being recognized as being received by either the first or the second camera or sensor;
(e) providing at least one first display on the first side of the door, the at least one first display for indicating a condition or status; and
(f) indicating the condition or status selected from the group consisting of:
(i) an area associated with the door is occupied; and
(ii) an area associated with the door is available.

11. The method of claim 10 further comprising providing a second actuator in communication with the processor and providing a second predetermined gesture or movement pattern to lock and unlock the door, whereby the actuator may be activated to lock or unlock the door in response to the second predetermined gesture or movement pattern being recognized as being received by the second camera or sensor.

12. The method of claim 10 further comprising providing a second actuator adapted to close the enclosed area door in response to a second predetermined gesture or movement pattern being recognized as being received by either the first or second camera or sensor by means of the processor.

13. The method of claim 10, wherein the step of providing a mechanism adapted to open the door in response to a first predetermined gesture or movement pattern being recognized as being received by either the first or the second camera or sensor is the step of providing a mechanism adapted to open the door in response to a wave hand motion or a circular hand motion being recognized as being received by either the first or the second camera or sensor.

14. The method of claim 10 further comprising providing a housing comprising a first shell segment on the first side of the door, the first shell segment encapsulating at least a portion of the processor, at least a portion of a locking mechanism, and at least a portion of the first camera or sensor.

15. The method of claim 10 further comprising providing a housing comprising a first shell segment on the first side of the door, the first shell segment encapsulating at least a portion of the processor, at least a portion of a locking mechanism, and at least a portion of the first camera or sensor, wherein the housing further comprises a second shell segment, a portion of which nests inside the first shell segment to provide a horizontally extendable housing.

16. The method of claim 10 further comprising providing a housing comprising a first shell segment on the first side of the door, the first shell segment encapsulating at least a portion of the processor, at least a portion of a locking mechanism, and at least a portion of the first camera or sensor, and further comprising a door-engaging gear set at least partially encapsulated by the housing and the gear set coupled to a DC motor, the DC motor in electrical communication with the processor.

17. An improved apparatus for opening and closing a door, the improved apparatus comprising:
(a) a first camera or sensor on a first side of the door;
(b) a second camera or sensor on a second side of the door;
(c) a processor:
(i) the processor being in communication with the first camera or sensor, the processor adapted to receive a first data signal from the first camera or sensor;
(ii) the processor being in communication with the second camera or sensor, the processor further adapted to receive a second data signal from the second camera or sensor; and
(iii) the processor further comprises a gesture-recognition or movement pattern-recognition module adapted to read the first and second data signals to determine whether the first data signal or the second data signal is at least one predetermined gesture or movement pattern;
(d) a first actuator in communication with the processor, the first actuator adapted to open the door when activated by the processor when the gesture-recognition or movement pattern-recognition module determines the gesture or movement pattern captured by the first or second camera or sensor is at least one predetermined gesture or movement pattern; and
(e) a housing comprising a first shell segment on the first side of the door, the first shell segment encapsulating at least a portion of the processor, at least a portion of a locking mechanism, and at least a portion of the first camera or sensor;

(f) at least one first display on the first side of the door, the at least one first display for indicating a condition or status, the condition or status selected from the group consisting of:
  (i) an area associated with the door is occupied; and
  (ii) an area associated with the door is available.

18. The apparatus of claim 17, wherein the housing further comprises a second shell segment, a portion of which nests inside the first shell segment to provide a horizontally extendable housing.

19. The apparatus of claim 17 further comprising a door-engaging gear set at least partially encapsulated by the housing and the gear set coupled to a DC motor, the DC motor in electrical communication with the processor.

20. A method for hands-free operation of a door, the method comprising:
  (a) providing a first camera or sensor on a first side of the door;
  (b) providing a second camera or sensor on a second side of the door;
  (c) providing a processor adapted to couple to the door, the processor in bi-directional communication with each camera or sensor;
  (d) providing a mechanism adapted to open the door in response to a first predetermined gesture or movement pattern being recognized as being received by either the first or the second camera or sensor; and
  (e) providing a housing comprising a first shell segment on the first side of the door, the first shell segment encapsulating at least a portion of the processor, at least a portion of a locking mechanism, and at least a portion of the first camera or sensor;
  (f) providing at least one first display on the first side of the door, the at least one first display for indicating a condition or status; and
  (e) indicating the condition or status selected from the group consisting of:
    (i) an area associated with the door is occupied; and
    (ii) an area associated with the door is available.

21. The method of claim 20, wherein the housing further comprises a second shell segment, a portion of which nests inside the first shell segment to provide a horizontally extendable housing.

22. The method of claim 20 further comprising a door-engaging gear set at least partially encapsulated by the housing and the gear set coupled to a DC motor, the DC motor in electrical communication with the processor.

* * * * *